Jan. 19, 1965 R. H. OTIS 3,166,037
FLOTATION AND STRUCTURAL UNITS AND BUILDING STRUCTURES
Filed June 20, 1962 6 Sheets-Sheet 1
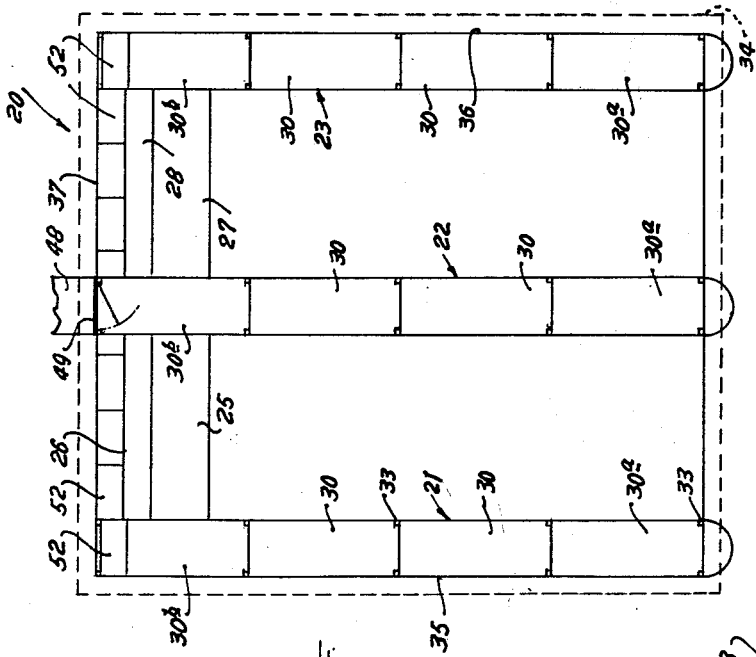
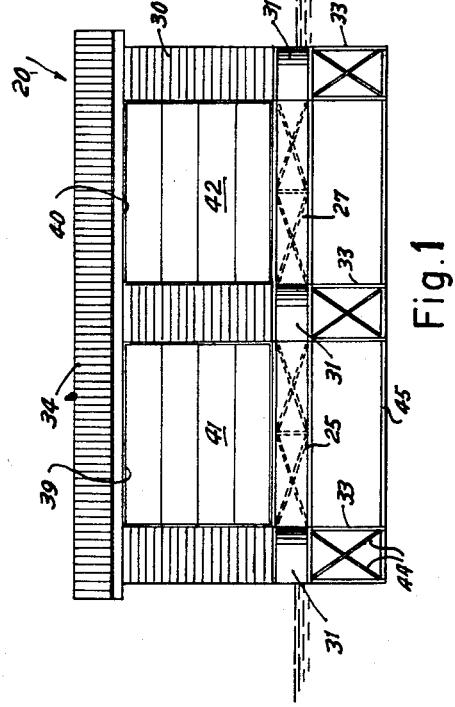
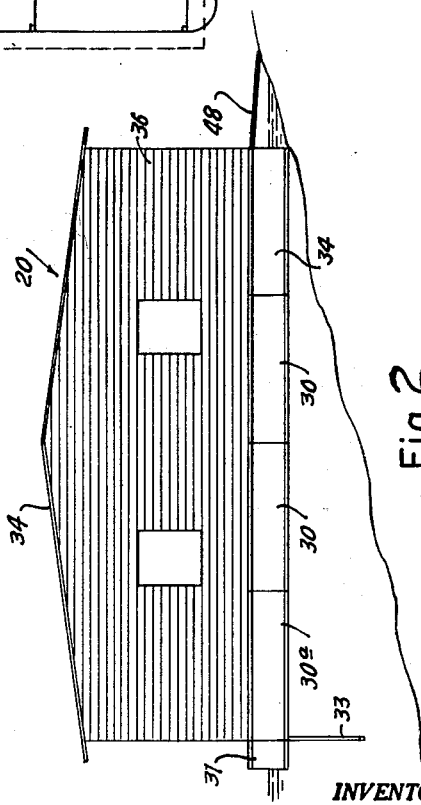
INVENTOR.
Roger H. Otis
BY
ATTORNEYS Jan. 19, 1965  R. H. OTIS  3,166,037
FLOTATION AND STRUCTURAL UNITS AND BUILDING STRUCTURES
Filed June 20, 1962  6 Sheets-Sheet 2
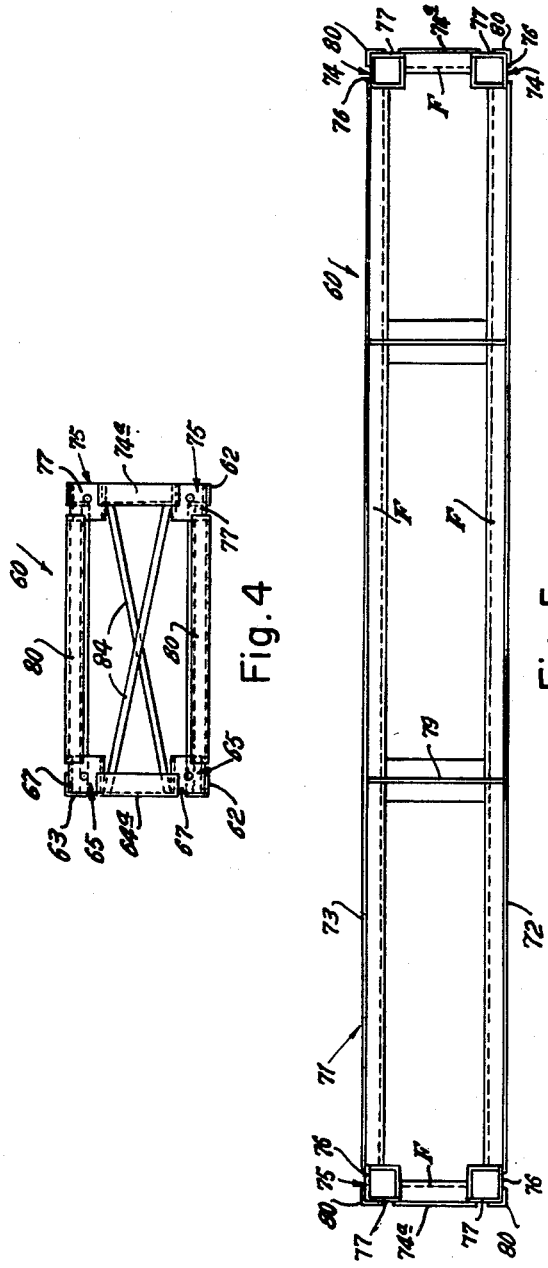
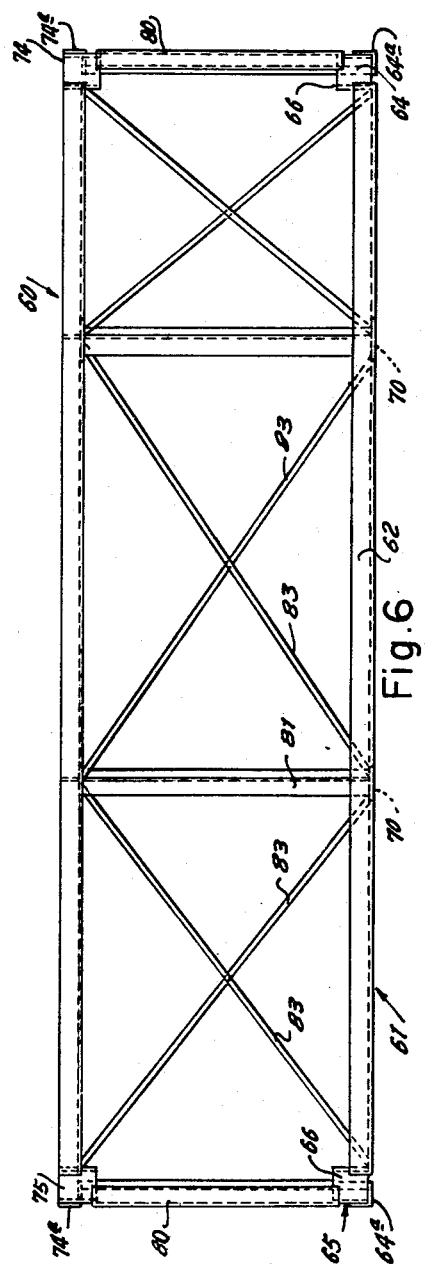
INVENTOR.
Roger H. Otis
BY
ATTORNEYS

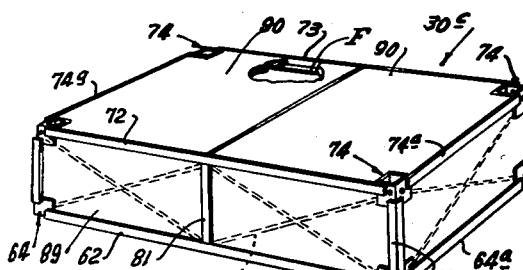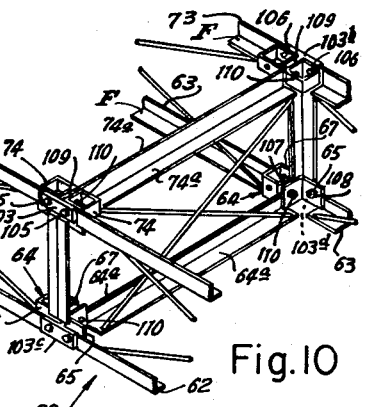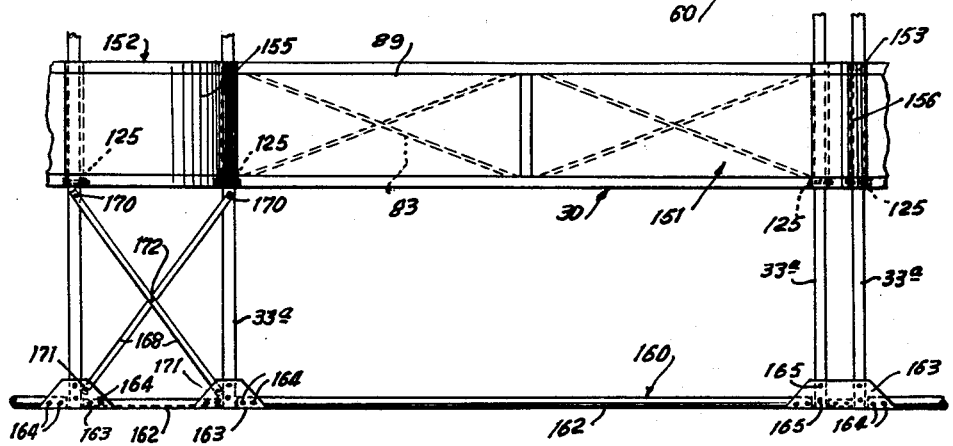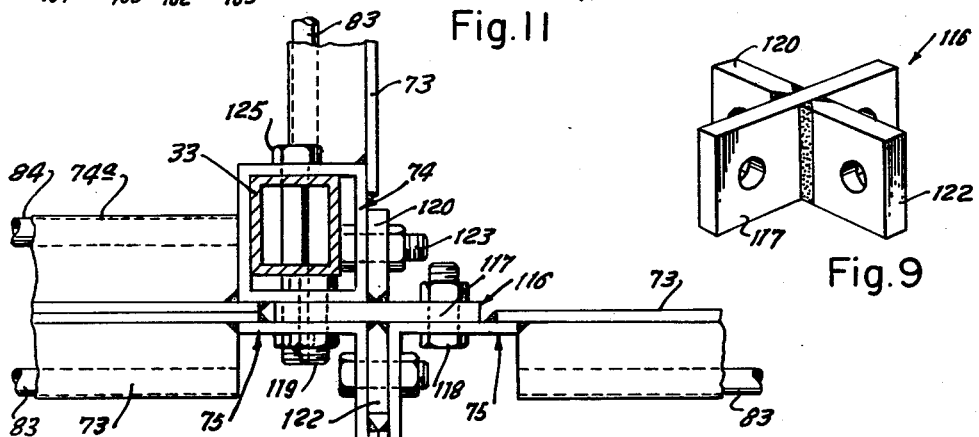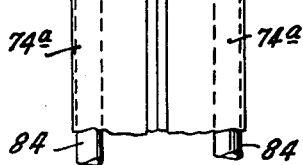

Jan. 19, 1965    R. H. OTIS    3,166,037
FLOTATION AND STRUCTURAL UNITS AND BUILDING STRUCTURES
Filed June 20, 1962    6 Sheets-Sheet 4
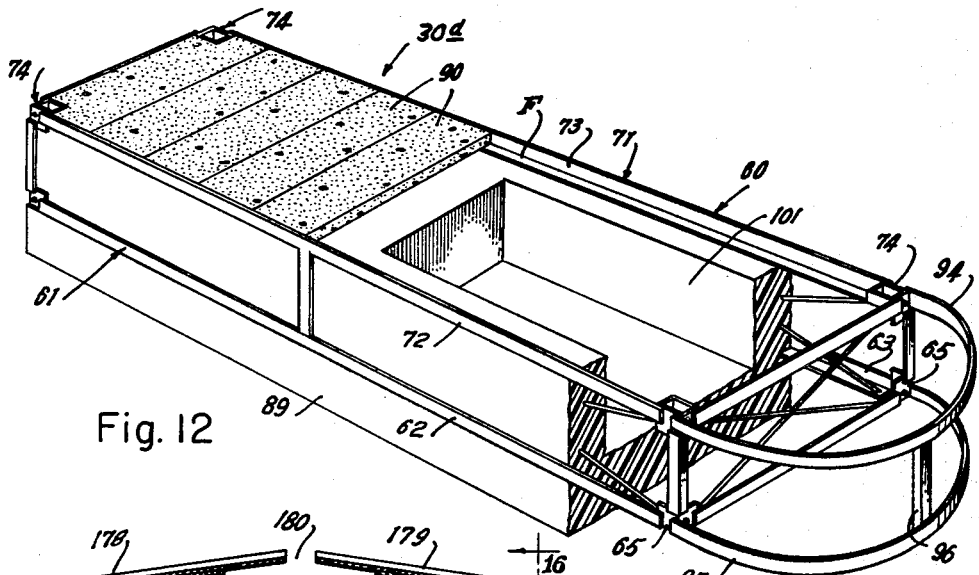
Fig. 12
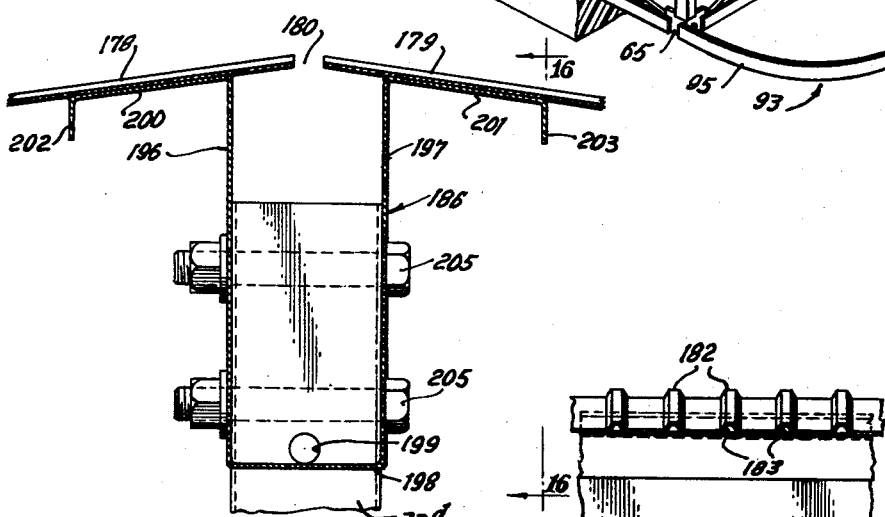
Fig. 15
Fig. 16
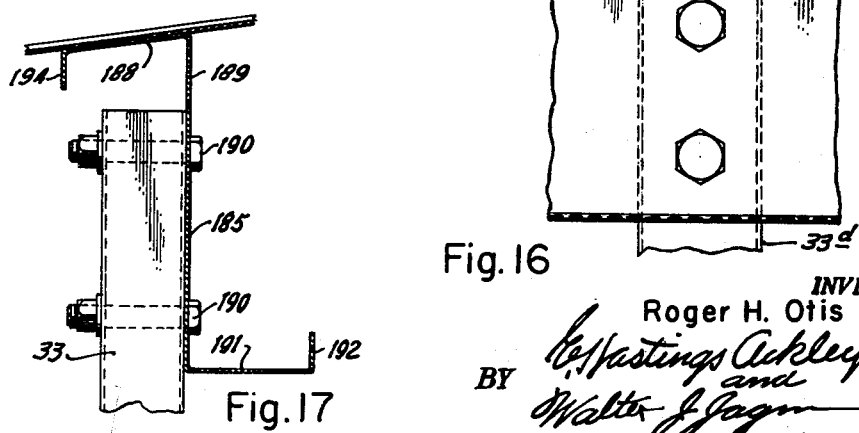
Fig. 17
INVENTOR.
Roger H. Otis
BY
ATTORNEYS

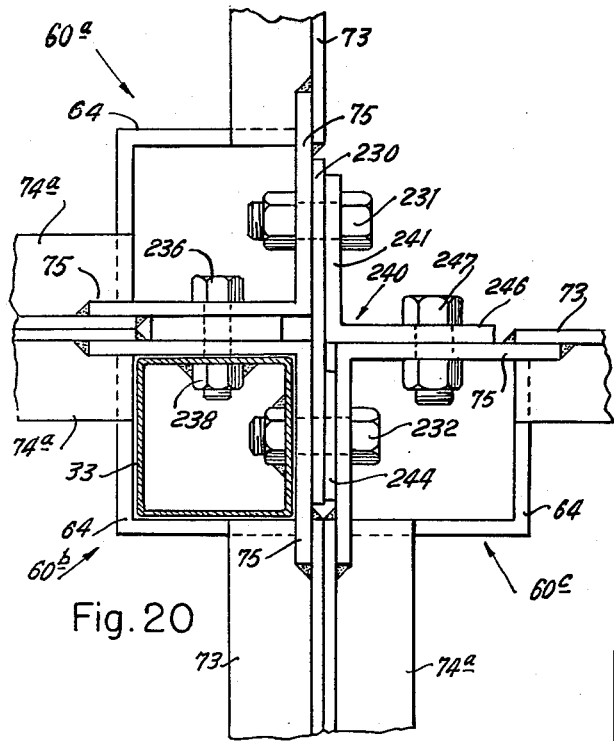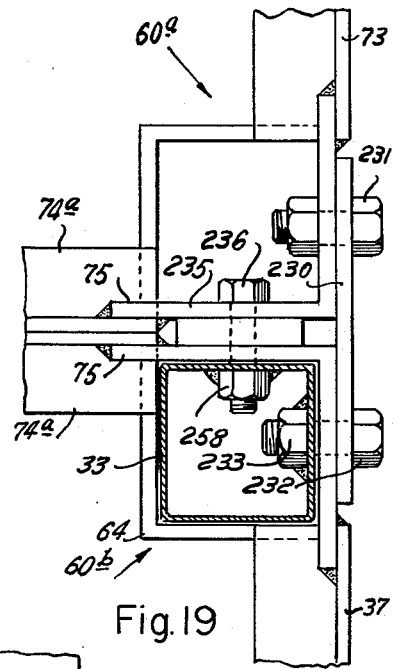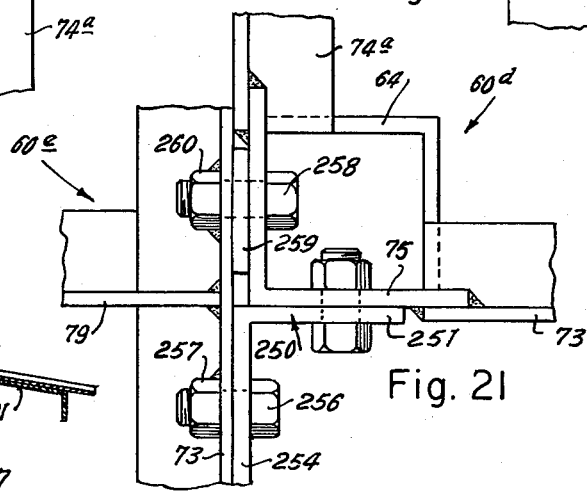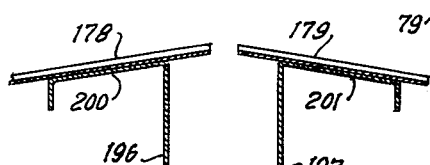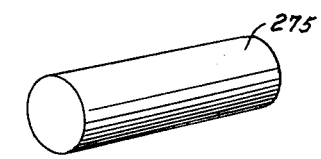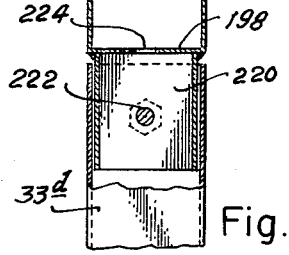
INVENTOR
Roger H. Otis
ATTORNEYS United States Patent Office 3,166,037
Patented Jan. 19, 1965

3,166,037
FLOTATION AND STRUCTURAL UNITS AND
BUILDING STRUCTURES
Roger H. Otis, P.O. Box 161, McAlester, Okla.
Filed June 20, 1962, Ser. No. 203,973
7 Claims. (Cl. 114—.5)

This invention relates to flotation units, to floatable structural units or modules, to flotation structural units or modules and to building structures constructed for such structural units.

This application is a continuation-in-part of my application Serial Number 179,366, filed March 13, 1962.

An object of this invention is to provide a new and improved structure formed of prefabricated structural units or modules.

Another object is to provide a floatable building structure which is easily assembled of prefabricated units or modules at the site of use.

Still another object of the invention is to provide a new and improved structural module for use in constructing floatable structures.

A further object is to provide a structural unit or module having a rigid frame embedded in an expanded substance which imparts buoyancy to the modules.

A still further object is to provide a structural module of the type described wherein the frame provides a support surface for planks, concrete slabs, or the like, which overlie the plastic substance to protect it from wear.

Another object is to provide a structural module wherein the plastic expanded substance extends below the rigid frame whereby the frame is supported out of the water when the module floats thereon in order to help protect the frame from corrosion and the like.

Still another object is to provide floatable structural modules having means for easily connecting the modules one to another at the site of construction.

A further object is to provide new and improved interconnectable structural modules having a means for connecting underwater bracing trusses thereto and for supporting a roof structure thereon.

A still further object is to provide a floatable building structure formed of a plurality of floatable structural modules which has a roof and walls and which has an underwater rigidifying bracing truss.

A further object is to provide a flotation unit formed of an expanded plastic substance subjected uniformly throughout its mass to high temperature and pressure during its fabrication to cause the flotation unit to possess required strength and rigidity.

Additional objects and advantages of the invention will be readily apparent from the reading of the following description of a device constructed in accordance with the invention, and reference to the accompanying drawings, thereof, wherein:

FIGURE 1 is a front view of a floating boathouse constructed in accordance with the invention;

FIGURE 2 is a side view of the boathouse illustrated in FIGURE 1;

FIGURE 3 is a schematic illustration of the manner in which the structural modules of the boathouse of FIGURES 1 and 2 are interconnected;

FIGURE 4 is an end view of the frame of a structural module embodying the invention;

FIGURE 5 is a top view of the frame of FIGURE 4;

FIGURE 6 is a side view of the frame of FIGURE 4;

FIGURE 7 is a perspective view of a structural module embodying the invention with protective concrete slabs disposed in the upper end of the frame;

FIGURE 8 is a fragmentary sectional view showing the manner in which the frames of structural modules may be interconnected;

FIGURE 9 is a perspective view of the connector employed in connecting a plurality of modules;

FIGURE 10 is a fragmentary perspective view showing the manner in which two frames of two structural modules may be connected in end to end relationship;

FIGURE 11 is a vertical fragmentary view showing the manner in which an underwater bracing truss may be connected to the modules of a floating structure;

FIGURE 12 is a perspective view, with some portions broken away, of another form of the structural module embodying the invention;

FIGURE 15 is a fragmentary enlarged vertical sectional view showing the manner in which the central roof gutter is secured to the roof;

FIGURE 16 is a fragmentary sectional view taken on line 16—16 of FIGURE 15;

FIGURE 17 is a fragmentary sectional view showing the manner in which the roof of the boathouse may be secured to columns supported by the modules;

FIGURE 18 is a fragmentary sectional view showing another manner in which the central roof gutter and purlin may be secured to the roof;

FIGURE 19 is a fragmentary sectional view showing another manner in which the frames of two structural modules may be interconnected;

FIGURE 20 is a fragmentary sectional view showing another manner in which the frames of three structural modules may be interconnected;

FIGURE 21 is a fragmentary sectional view showing the manner in which the end of one structural module may be connected to the side of another structural module intermediate the ends thereof; and FIGURE 22 is a perspective view of a flotation unit embodying the invention.

Figure 13:
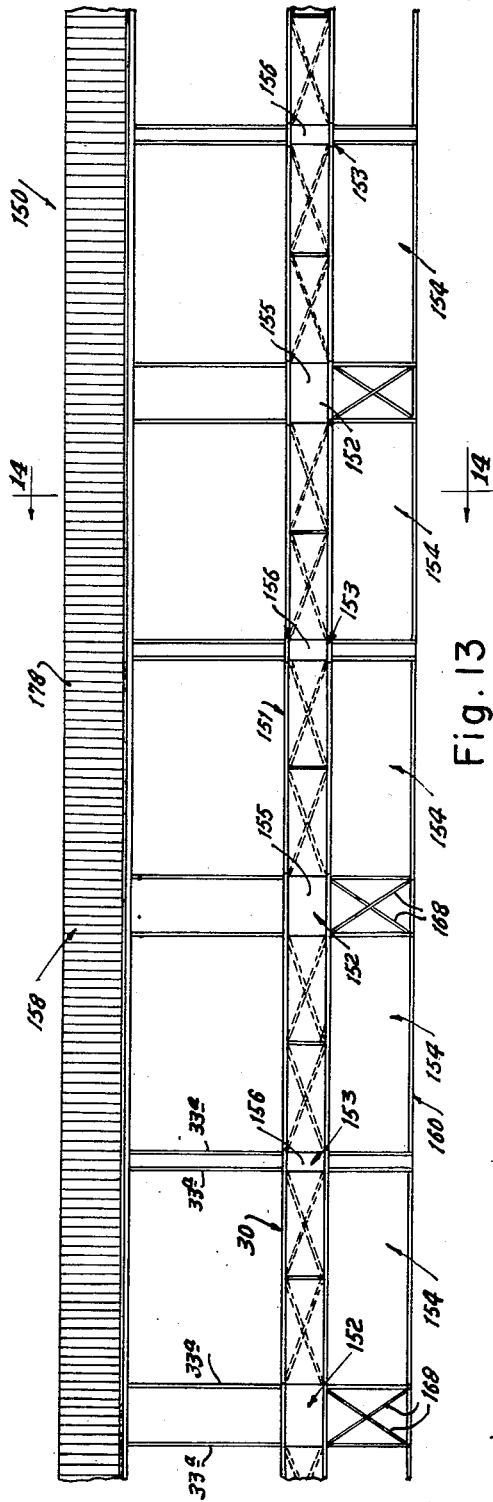
FIGURE 13 is a side view of a floating boathouse constructed in accordance with the invention.

Referring now particularly to FIGURES 1 through 3 of the drawing, the floating boathouse structure 20 embodying the invention includes three laterally spaced walkways 21, 22 and 23. The adjacent walkways 21 and 22 are connected at their rear portions by means of the transversely extending modules 25 and 26 while the adjacent walkways 22 and 23 are similarly connected by the transverse modules 27 and 28. Each of the walkways is formed of a plurality of rectangular floatation units or modules 30 and a front module 30a which has a rounded arcuate forward end portion 31. Vertical columns 33 are rigidly secured to the modules 30 and extend upwardly therefrom to support the roof 34.

The outermost columns of the walkways may have secured to them in any suitable manner, as by screws or bolts, the sheet metal sidewalls 35 and 36, the rear wall 37, and the front wall 38. The front wall is provided with door openings 39 and 40 which are closable by suitable overhead doors 41 and 42, respectively, mounted in any suitable manner to the columns.

The forward columns 33 secured to the front modules 30a extend downwardly of these modules and are connected by suitable cross braces 44 to form trusses. The lower ends of the trusses are connected by a horizontal beam 45 which extends transversely across the openings or slips between the walkways at a depth sufficiently great to permit the passage of boats into the slips of the boathouse.

The rear end of the boathouse is adapted to be anchored to the shore so that a gangplank 48 may extend from the shore to the rear end of the central walkway 22 to permit traffic between the shore and the boathouse through the door opening 49 in the rear wall 37 which of course may be closed by the door 50. Lockers 52 may be supported on the rear portions of the rear modules 30b of the outer walkways 21 and 23 and on the rearmost transverse modules 26 and 28 which connect the walkways to one another.

The modules 30 are buoyant and cause the boathouse to float on the water so that the boathouse will rise and fall with variations in the water level and also so that the boathouse may be floated from one location to another.

Each of the modules 30 has a rigid metallic frame 60 which includes a lower frame section 61 having a pair of longitudinal parallel side angle members 62 and 63 which may be connected at their outer ends to transverse end angle members 64a by either the end connector members 64 or the end connector members 65. The end connector members 64 may be tubular and rectangular in cross section so that their sides 64b and 64c may be welded to the horizontal flanges to the side and end angle members at the ends thereof to add rigidity to their flanges while the end connector members 65 may be in the form of angles if such added bracing or rigidifying of the horizontal flanges is not welded. The connector members 64 and 65 have sides or legs 66 which abut the inner sides of the vertical flanges of the longitudinal angle members 62 and 63 and are rigidly secured thereto in any suitable manner, as by welding. The sides or legs 67 of the connector members abut the inner surfaces of the vertical flanges of the transverse angle members 64a which extend between the longitudinal angle members 62 and 63 of each frame to thus form therewith the lower frame section. The horizontal flanges of the angle members forming the rectangular lower frame section are shorter than the vertical flanges thereof to form rectangular openings. If an end connector member 65 is disposed at a corner of the lower frame section, the connector member defines two sides of the opening whereas, if the tubular connector member 64 is disposed at a corner of the lower frame section, the four sides of the tubular connector member define the opening at such corner. The longitudinal angle members of the lower frame section may also be connected at intermediate points by means of the transverse members 70 which extend between and are rigidly secured in any suitable manner to the horizontal flanges of these angle members.

The frame also includes an upper frame section 71 having a pair of parallel longitudinal angle members 72 and 73 which are disposed above and parallel to the longitudinal angle members 62 and 63, respectively, of the lower frame section. The longitudinal angle members may be connected at their ends to the transverse angle members 74a by the end connector members 74 or 75 as desired. The connector members 74 are similar to the end connectors 64 of the lower frame section and are tubular and rectangular in cross section. The end connector members 75 are similar to the end connector members 65, and each has one leg 76 thereof abutting the inner surface of the vertical flange of its adjoining longitudinal member 72 or 73 and has its other leg 77 abutting the vertical flange of an adjacent transverse horizontal angle member 74a. Each end connector member 75 is of course secured to the vertical flanges of the angle members of the upper frame section in any suitable manner, as by welding. The longitudinal members 72 and 73 of the upper frame section may be connected intermediate their ends by longitudinally spaced transversely extending bars or straps 79.

The upper and lower frame sections are connected to one another by the corner vertical angle members 80 which abut the outer surfaces of the vertically aligned end connector members of the upper and lower frame sections and rigidly secured thereto, as by welding, and also by the intermediate vertical angle members 81 which extend between the longitudinal angle members of the lower and upper frame sections and are rigidly secured thereto, as by welding. Bracing rods 83 extend diagonally between the horizontal flanges of the longitudinal members of upper and lower frame sections and are rigidly secured thereto in any suitable manner, as by welding. Similarly, bracing rods 84 may extend diagonally between and be rigidly secured to the corner angle members 80 at the end of each frame.

The frames 60 may have either the tubular connector members 64 and 74 or the angle connector members 65 and 75 as desired, the tubular connector members being used where the particular module is to support a column 33 or other such structure. The frames 60 of different modules may be of different lengths and widths depending on desired dimensions of the modules and are embedded in an expanded plastic substance 89, as by means of the apparatus illustrated and described in applicant's copending application, filed March 13, 1962, Serial No. 179,366. The expanded plastic substance may be a foamable plastic, such as polystyrene and the foaming or charging agent may be methylchloride, butane, heptane, or the like. It will be apparent that the expanded plastic substance 89 in which the frame 60 is embedded will impart buoyancy to the module. The foamable plastic substance of each module extends up to the horizontal flanges of the transverse and longitudinal angle members 72, 73 and 74a of the upper frame section 71 of the frame 60 so that the horizontal flanges F of these members are exposed and are adapted to support floor members, such as planks, concrete slabs 90, or the like, as shown in FIGURES 7 and 12, which protect the upper surfaces of the expanded plastic substance from wear.

The module 30c illustrated in FIGURE 7 is shown provided with only two concrete slabs 90 disposed on opposite sides of the intermediate transverse member 79 of the upper frame section thereof while the module 30d is shown provided with several narrow concrete slabs. If desired, the concrete may be poured in place over the plastic substance to form the wear resistant floor surface. In this event, a steel or metal deck may be placed over the plastic substance and supported on the flanges and the plastic concrete poured thereon.

The expanded plastic substance of the module 30, illustrated in FIGURES 1, 2, 3 and 7, does not extend below the lower frame section 61. If desired, the expanded plastic substance of a module, such as the module 30d illustrated in FIGURE 12, may extend below the lower frame section 61 so that the lower frame section under normal conditions will be disposed above the surface of the water in which the module is afloat. The frame 60 of the module 30d has an arcuate extension 93 formed of an upper arcuate strap 94 secured to the connector members 74 of the upper frame section thereof and a similar lower arcuate strap 95 secured to the connector members 65 of the lower frame section. The arcuate straps may be connected by vertical brace members 96. The frames of the forward modules 30a of the boathouse illustrated in FIGURES 1, 2 and 3 are provided with such arcuate extensions 93 to form the forward end portions thereof.

If desired, voids or cavities 101 may be formed in the expanded plastic substance 89 of each module for purposes of economy and the concrete slabs 90 or planking or other floor support members will then extend across such void or cavity.

The completed modules, such as the modules 30c illustrated in FIGURE 7 and the module 30d illustrated in FIGURE 12, may be connected together in end to end relationship by means of T-shaped tie plates 103 whose cross flanges extend between the adjacent ends of the longitudinal members of the upper and lower frame sections and which are secured to the connector members at adjacent corners of the modules and whose legs extend between such connector members. For example, the tie plate 103 between the longitudinal members 72 of the frames of two adjacent modules is connected to the tubular connector members 74 of the two frames by means of the bolts 105 which extend through aligned apertures in the tie plate 103a and in the end connector members 74. The tie plate 103b between the adjacent ends of the longitudinal members 73 of the two modules is similarly connected to the adjacent connector members 74 by the bolts 106. Similarly, the tie plates 103c and 103d between adjacent ends of the longitudinal angle members 62 and 66, respectively, of the two modules are connected to the angle connector members 65 of one frame section and the tubular connector members 64 of the other frame by means of the bolts 107 and 108, respectively, which extend through suitable apertures in the connector members and the tie plates. The legs 100 of the tie plates may be secured to adjacent connector members by the bolts 110.

In the process of forming the modules, the expanded plastic substance is either prevented from filling the spaces adjacent the connector members 64, 65, 74 and 75 or may be removed to provide access to the bolts 111 securing the columns 33 to the modules as will be explained below.

If it is desired to connect more than two modules at a particular location in assembling a building structure, the cross-shaped connector plates 116 may be employed in the manner illustrated in FIGURE 8 to connect the modules to one another. The cross-shaped connector 116 includes a bar 117 which may extend between the outer sides of the adjacent connector members 74 and 75 of adjacent modules and be connected thereto by means of the bolts 118 and 119. The bolt 119 may be of sufficient length to extend through suitable aligned apertures of the sides or legs of two connector members, such as the connector members 74 and 75 and the strap 117, as shown in FIGURE 8, so that when the end of one module abuts the side of another module, the bolt 119 may secure the connector members 74 and 75 thereof and the strap to one another. The leg or flange 120 of the cross-shaped connector 116 then abuts another side of the connector member 74 and is secured thereto by a bolt 131. The other leg 122 of the connector 116 extends between the adjacent flanges of the angle connector members 75 of adjacent modules and is secured thereto by the bolt 123. The columns 33 where needed are secured to modules whose frames 60 at such corners are preferably provided with the vertically aligned tubular connector members 64 and 74. The column 33 passes through such vertically aligned connector members and is secured thereto by a bolt 125 which extends through suitable aligned apertures in one of the connector members and in the column. As illustrated in FIGURE 8, the column is secured to the connector member 64 of the lower frame section.

The heads of the bolts 123 and 119 which are disposed within the members 74 of the upper frame section abut the sides of the tubular member 33, as shown in FIGURE 8, to help maintain it in position. If desired, the bolt 119 could be replaced by a long bolt 125 which would extend through suitable aligned apertures in the tubular connector member 74, the column 33, the strap 117 of the cross-shaped connector member and the angle connector member 75 of the upper frame section of the adjacent module.

The expanded plastic substance of the module is of course provided with an appropriate passage for the reception of the column.

It will now be apparent that due to the provision of the connector members of the upper and lower frame sections, whose extreme end portions abut the inner surfaces of the vertical flanges of the angle members, the outer surfaces of the connector members are exposed to permit the insertion of the legs of the T-shaped tie plates or the cross-shaped connectors between adjacent outer surfaces of adjacent connector members of the frames of adjacent modules so that the modules may be easily and rigidly assembled in any of a multiplicity of arrangements to form such building structures as the floating boathouse illustrated in FIGURES 1 through 3, 13 and 14.

Figure 14:
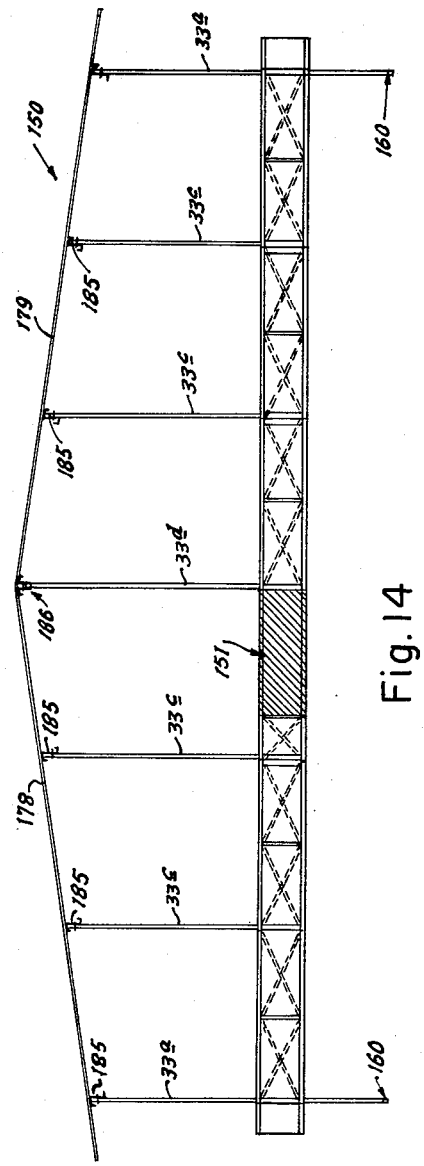
FIGURE 14 is a schematic vertical sectional view taken on line 14—14 of FIGURE 13.

Referring now particularly to FIGURES 11, 13 and 14, the floating boathouse 150 illustrated is provided with a main longitudinal walkway 151 from which extend transversely in opposite directions the walkways 152 and the slip dividers 153 disposed between and spaced from adjacent walkways. It will be apparent that the slip dividers 153 and the transverse walkways 152 form slips 154 which extend transversely laterally of the floating boathouse so that boats may be berthed in slips on opposite sides of the main longitudinal walkway. The walkway is formed of relatively wide modules to provide a broad walkway while the transversely extending walkways 152 are narrower in width for purposes of economy and because the traffic thereon is of course lighter than on the main walkway. The slip dividers 153 are formed of very narrow modules since access to each slip is provided by its adjacent transverse walkway 152.

The outermost modules of the transverse walkways and of the slip dividers are provided with arcuate extensions 155 and 156, respectively. The columns 33a which are supported by and secured to such outermost modules of the transverse walkways and the slip dividers extend downwardly of the modules and are connected at their lower ends by the horizontal beams 160 formed of sections 162 which extend between the lower ends of the longitudinally aligned columns 33a at each side of the boathouse and are secured thereto by means of the plates 163 and the bolts 164, which extend through the plates 163 and the sections 162 of the horizontal beam and by means of the bolts 165 which extend through the plates 163 and the columns 33a. Cross braces 168 extend between the columns 33a of the outermost modules of the walkways 152 and have their upper ends secured to such columns by means of the bolts 170 while their lower ends are connected to the tie plates 163 by means of the bolts 171. The cross braces at their intersections may be connected by the bolts 172.

The roof 158 may be formed of two sections 178 and 179 whose adjacent upper longitudinal edges are spaced to provide a longitudinal vent passage 180. The roof sections slope transversely outwardly and downwardly relative to one another and are preferably formed of corrugated metal whose upwardly extending transverse ribs or corrugations 182 provide ventilation passages 183 through which hot air may flow upwardly toward the vent passage 180 past the purlins 185 by means of which the roof sections are secured to the outermost columns 33a and the intermediate columns 33c and past the ridge gutter and purlin 186 which supports the upper edge portions of the roof sections on opposite sides of the vent passage 180.

Each of the purlins 185 is secured to longitudinally aligned columns 33a or 33c and preferably extends the length of the roof. Each purlin includes an upper downwardly and outwardly sloping flat support section 188 upon which a roof section rests and a vertical section 189, which abuts the sides of the longitudinally aligned columns and which is secured to the columns by means of the bolts 190 which extend through suitable apertures in the columns and in the vertical section. The purlins 185 also have lower horizontal sections 191 which extend horizontally outwardly from the lower end of the vertical sections of the purlin and which in turn are provided with upwardly extending flanges 192. The support section 188 is similarly provided with rigidifying and reinforcing downwardly extending vertical flange 194. It will be apparent that the horizontal section and the flanges 192 and 194 impart rigidity and strength to the purlins. It will be apparent that the slope of the support section 188 of each purlin conforms to the slope of the roof section it supports so that the roof sections abut the supporting sections 188. The roof sections may be secured to the supporting sections 188 in any suitable manner, as by spot welding, screws and the like.

The ridge gutter and purlin 186 has a gutter formed of the vertical sections 196 and 197 which are joined at their lower ends by the horizontal web 198. The upper ends of the horizontal sections 196 and 197 are provided at their upper ends with divergently outwardly extending flat support sections 200 and 201, respectively, upon which the roof sections 179 and 178 rest. The downward and outward slope of the support sections 200 and 201 of the ridge gutter and purlin 186 conforms to the slope of the sections 178 and 179, respectively. The support sections are provided at their outer free ends with downwardly extending flanges 202 and 203, respectively, which serve to add rigidity and strength to the gutter ridge and purlin. The web 198 is of greater width than the width of the central longitudinally aligned tubular columns 33 of the boathouse and is provided with suitable apertures through which the columns 33d extend into the gutter between the vertical sections 196 and 197. The columns are spaced from the vertical sections. The ridge gutter and purlin 186 is connected to the central longitudinally aligned columns 33d by means of bolts 205 which extend through suitable aligned apertures in the columns and in the vertical sections 196 and 197 of the ridge gutter and purlin. Any suitable sealing means may be employed to seal between the web 198 and the columns 33d to prevent flow of liquid from the ridge gutter and purlin down the columns 33d. The ridge gutter and purlin extends the length of the floating boathouse and preferably has open ends so that any water entering into the ridge gutter through the vent passage 180 will drain from either end of the ridge gutter at opposite ends of the boathouse and downwardly into the hollow columns 33d through the drain holes or apertures 199 in the sides thereof disposed immediately above the web 198. If desired, of course, the opposite ends of the gutter could be provided with downspouts in any suitable manner.

The ridge gutter and purlin 186 may also be connected to the columns 33d in the manner illustrated in FIGURE 18 by means of rectangular tubular dependent extensions 220 welded to the web 198 and telescoped into the upper ends of the columns 33d. The tubular extensions 220 are rigidly secured to the columns by means of bolts 222 which extend through suitable apertures in the columns and the tubular extensions. The web 198 of the ridge gutter is provided with drain apertures or holes 224 which open downwardly into the tubular extensions 220 so that the water may drain downwardly through the columns 33d as well as through the open opposite ends of the ridge gutter and purlin.

In FIGURE 19 is illustrated a preferred manner of connecting the modules one to another and of connecting the columns 33 thereto. As illustrated, the lower frame sections of the frames 60a and 60b are provided with a tubular end connector 64 and the upper frame sections are provided with the angle end connector members 75. Instead of employing the T-shaped tie plates 103, a flat tie plate 230 abuts the outside surfaces of the end connector members of the upper frame sections and is secured thereto by bolts 231 and 232. The bolt 232 extends not only through suitable apertures in the flat tie plate 230 and the angle end connector member 75 but also through a suitable aperture in the tubular column 33 into the nut 233 rigidly secured as by welding to the column 33. A spacer plate 235 is interposed between the adjacent surfaces of the end connector members 75 and a bolt 236 extends through suitable apertures in the end connector members 75, the spacer 235 and the tubular column 33 and is threaded in the nut 238 welded to the interior inner surface of the column 33. It will of course be apparent that the end connector members 64 of the lower frame sections of the two frames are similarly connected to one another.

In FIGURE 20 is illustrated another method of connecting the frames of three modules 60c to one another wherein an angle tie member 240 has one leg 241 abutting the flat tie plate 230 so that the bolt 231 extends through a suitable aperture of the leg 241 of the angle tie member as well as through apertures in the tie plate 30 and the angle end connector member 75 of the frame 60a. The bolt 232 extends through a suitable aperture in the spacer 244 interposed between the tie plates and the adjacent surface of an end connector member 75 of the frame 60c as well as through suitable apertures in the tie plate 230, the end connector member 75 and the tubular column 33. The other leg 246 of the angle tie member 240 is secured to the end connector member 75 of the frame 60c by means of the bolt 247. The end connector members 64 of the lower frame sections of these three frames of course may be similarly connected by the use of an angle tie member 240 and an additional spacer 244.

In FIGURE 21 is illustrated the manner in which the frame 60d of one module may be connected to the side of another frame 60e at a location intermediate the ends of the frame 60e by means of the angle tie member 250. The leg 251 of the angle tie member is connected to the end connector member 75 of the frame 60d by means of the bolt 253 which extends through suitable apertures in the leg 251 and the end connector member while the leg 254 of the angle tie member abuts the outer surface of the vertical flange of the longitudinal frame member 73 of the frame 60e and is rigidly secured thereto by means of the bolt 256 which extends through the suitable apertures in the leg 254 and the vertical flange of the longitudinal frame member 73 into a nut 257 rigidly secured to the inner surface of the vertical flange as by welding. The end connector member 75 of the frame 60d is connected to the vertical flange of the longitudinal frame member 73 by a bolt 258 which extends through suitable apertures in the end connector member 75 of the frame 60d, a spacer plate 259 interposed between the vertical flange of the longitudinal frame member 73 of the frame 60e and the vertical flange into the nut 260 rigidly secured to the inner surface of the vertical flange, as by welding.

The other end connector member 75 of the upper frame section and end connector members 64 of the lower section of the frame 60d are of course similarly connected to adjacent longitudinal frame members of the frame 60e in the same manner.

It will now be seen that by the use of the various tie plates and members the modules may be connected to one another in any desired arrangement by the connection of their frames to one another.

As is explained in my co-pending application, Serial No. 179,366, filed March 13, 1962, the structural units or modules are fabricated by placing the frames 60 in a suitable closed cavity or mold which is then filled with a foamable plastic, which may be polystyrene or the like and having a foaming or charging agent which may be methylchloride, butane, heptane, or the like. All portions of the plastic within the mold are then subjected to high temperatures of approximately 230 degrees Fahrenheit and to pressures of approximately fifteen pounds per square inch so that the plastic substance of the structural unit or module throughout its mass is subjected to the same uniform temperatures and pressures and the plastic expands and attains throughout its mass the same physical characteristics of hardness, rigidity and strength. As a result, the modules are very strong, although light, and may be combined and connected together to form marinas, wharves, rafts and the like as well as to form flotation units for various structures.

The cavity or mold may be of any desired shape, as for example rod shaped, so that the rod or log shaped flotation unit 275 may be formed of polystyrene which has been subjected during the fabrication of the flotation unit within a closed cavity or mold to temperatures of approximately 230 degrees Fahrenheit and fifteen pounds per square inch so that the flotation unit 275, even if it does not have embedded therein a rigid frame, such as a frame 60 is of sufficient hardness, rigidity and strength to act as a flotation unit for rafts, houseboats, and the like, the log-shaped flotation units being secured to one another or to other structures, such as decks or floors by any suitable means, such as straps and the like.

Since the flotation unit 275 throughout its whole mass has the same characteristics of hardness, rigidity and strength, it may be manufactured as a long rod which may then be sawed or cut by a hot wire into units of shorter lengths, if desired.

It will therefore be seen that a new and improved unit, which may be a flotation or structural unit, has been illustrated and described which is formed of a foamable plastic, such as polystyrene or the like, having a foaming or charging agent, which may be methylchloride, butane, heptane, or the like, expanded to attain the desired physical characteristics of hardness, rigidity, and strength by subjecting the full mass or all portions of the foamable plastic to temperatures of approximately 230 degrees Fahrenheit and fifteen pounds per square inch while the plastic is confined in a cavity or mold having the configuration desired for the flotation or structural unit.

It will now be seen that a new and improved floating structure, such as a boathouse, has been illustrated and described which is formed of a plurality of buoyant modules or structural units which have rigid frames by means of which the individual modules are connected to one another and which also provide a means for securing underwater bracing or truss structures, such as the beams 160 to the floating structure and also by means of which structures, such as walls and roofs, may be connected to and supported by the interconnected modules.

It will also be apparent that while the flat support sections of the purlins and of the ridge gutter and purlin extend the length of the building, the warm air which rises toward the roof is not trapped thereby but may flow upwardly toward the central longitudinal vent passage 180 between the two roof sections through the passages or grooves 183 of the roof past the support sections of the purlins and of the ridge gutter and purlin.

It will further be seen that new and improved structural units or modules 30 have been illustrated and described, each of which has a rigid frame embedded in an expanded or buoyant substance which imparts buoyancy to the modules.

It will further be seen that the frame provides the upwardly facing support surfaces F which support planks, concrete slabs or the like in overlying relationship to the buoyant substance to protect it from wear.

It will further be seen that the frames of the modules have connector members at their corners which are exposed so that a multiplicity of modules may be connected to one another by any suitable tie means, such as the tie plates 103 and the cross shaped connector member 116, to form buoyant structures, such as boathouses and the like.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A floatable module including: a rigid frame embedded in an expanded plastic substance; said frame having upwardly facing support surfaces above said expanded plastic substance for holding support means above said expanded plastic substance, said expanded plastic substance extending below said frame whereby said module may float on the water with said frame disposed above the surface of the water.

2. A floatable module including: a rigid frame embedded in an expanded plastic substance; said frame providing upwardly facing support surfaces above said expanded plastic substance; support means on said supporting surfaces of said frame extending above said expanded plastic substance, said expanded plastic substance extending below said frame whereby said module may float on the water with said frame disposed above the surface of the water.

3. A floatable module including: a rigid frame embedded in an expanded plastic substance; said frame providing plastic substance; planar support means on said supporting surfaces of said frame extending above said expanded plastic substance, said plastic substance being provided with an upwardly opening recess, said support means extending across and closing said recess.

4. A floatable module including: a frame embedded in an expanded plastic substance; planar support means supported by said frame, said frame having upwardly facing support surfaces above said expanded plastic substance for holding said support means above said expanded plastic substance, said frame having upwardly opening means for securing vertical columns thereto.

5. A floatable module including: a rigid frame embedded in a buoyant substance, said frame comprising upper and lower substantially rectangular frame sections, each of said frame sections comprising longitudinal side members, transverse end members and connector members connecting adjacent ends of said longitudinal and transverse members of each frame section, said end and side members of said upper frame section having horizontal flanges extending inwardly of the module and outer flanges extending vertically upwardly from said horizontal flanges; corner members secured to vertically aligned connector members of said upper and lower frame sections, at least one of said connector members being tubular in form whereby a column may extend through said one of said connector members and be rigidly secured thereto; and planar support means disposed between said vertical flanges and supported on said horizontal flanges above said buoyant substance.

6. A floatable module including: a rigid frame embedded in a buoyant substance, said frame comprising upper and lower substantially rectangular frame sections, each of said frame sections comprising longitudinal side members, transverse end members and connector members connecting adjacent ends of said longitudinal and transverse members of each frame section, said side and end members of said upper frame section having horizontal flanges extending inwardly of the module and vertical outer flanges extending upwardly from said horizontal flanges; corner members secured to vertically aligned connector members of said upper and lower frame sections, outer surfaces of said connector members at each corner of each frame section being disposed inwardly of the outer surfaces of adjacent longitudinal and transverse members of the frame section connected thereby; and planar support means disposed between said vertical flanges and supported on said horizontal flanges above said buoyant substance.

7. A floatable module including: a rigid frame embedded in a buoyant substance, said frame comprising upper and lower substantially rectangular frame sections, each of said frame sections comprising longitudinal side members, transverse end members and connector members connecting adjacent ends of said longitudinal and transverse members of each frame section, said side and end members of said upper frame section having horizontal flanges extending inwardly of the module and vertical outer flanges extending upwardly from said horizontal flanges; corner members secured to vertically aligned connector members of said upper and lower frame sections, at least one of said connector members being tubular in form whereby a column may extend through said one of said connector members and be rigidly secured thereto, outer surfaces of said connector members at each corner of each frame section being disposed inwardly of the outer surfaces of adjacent longitudinal and transverse members of the frame section connected thereby; and planar support means disposed between said vertical flanges and supported on said horizontal flanges above said buoyant substance.

References Cited in the file of this patent

UNITED STATES PATENTS

| | | |
|---|---|---|
| 2,986,749 | Webber | June 6, 1961 |
| 3,024,753 | Benson | Mar. 13, 1962 |
| 3,053,216 | Benson | Sept. 11, 1962 |
| 3,073,271 | Brill | Jan. 15, 1963 |
| 3,073,274 | Lamb | Jan. 15, 1963 |
| 3,078,938 | Bollum | Feb. 26, 1963 |
| 3,103,907 | Scholley | Sept. 17, 1963 |